S. HURD.
Clothes-Line Fastener.

No. 215,224. Patented May 13, 1879.

Witnesses.
L. F. Connor.
N. S. Whitney.

Inventor.
Sylvester Hurd.
by Crosby Gregory Attys

UNITED STATES PATENT OFFICE.

SYLVESTER HURD, OF BOSTON, MASSACHUSETTS.

IMPROVEMENT IN CLOTHES-LINE FASTENERS.

Specification forming part of Letters Patent No. 215,224, dated May 13, 1879; application filed September 19, 1878.

*To all whom it may concern:*

Be it known that I, SYLVESTER HURD, of Boston, county of Suffolk, State of Massachusetts, have invented an Improvement in Clothes-Line Fasteners, of which the following description, in connection with the accompanying drawings, forming a part thereof, is a specification.

This invention relates to a device to support clothes-lines; and the invention consists in a clothes-line supporter as an improved article of manufacture, it being composed of an attaching-plate, a hinged or pivoted arm, and a sheave supported and left free to rotate upon a stud which rises from the arm at right angles to the pivot which connects it with the attaching-plate.

Figure 1:
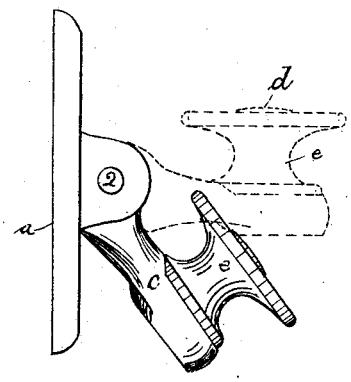
Figure 3:
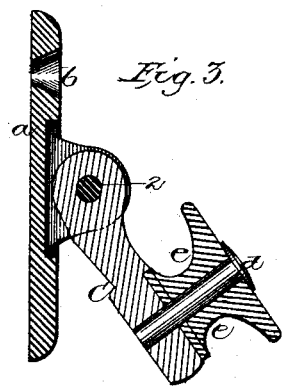
Figure 2:
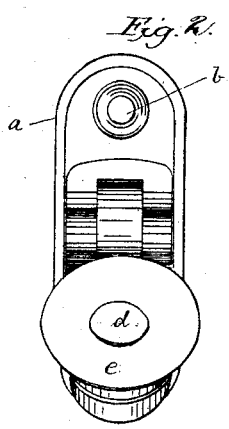

Figure 1 represents, in side elevation, one of my improved clothes-line supporters, and Fig. 2 a front elevation thereof; and Fig. 3 is a section taken through the pulley and arm.

The attaching-plate $a$, provided with openings $b$, adapted to receive screws by which to secure the plate to a post, wall, or other suitable place, has ears, upon which, by a pin, 2, is pivoted the arm $c$, on which is a headed stud, $d$, over which is placed a sheave or pulley, $e$, the upper disk of which is preferably made of larger diameter than the lower end.

By this device the line may be easily looped over the pulley, and, left slack, will rest upon the surface of the pulley, and when the line has been passed about all the supports it may be pulled taut, the line all the time bearing upon the pulleys and rendering freely over them until the arm $c$ is drawn up substantially in a horizontal position, as in dotted lines, Fig. 1, when the end of the line may be fastened.

If the arm $c$ were horizontal and rigid, the line would have to be kept taut as it was passed about each pulley, and should the pulleys be at different levels the line would fail to move readily.

With these supporters a line may be quickly put up and be easily drawn very taut.

I claim—

As an improved article of manufacture, the clothes-line supporter herein described, it consisting of the attaching-plate $a$, an arm, $c$, pivoted thereto, and the flanged pulley $e$, supported upon a stud on the arm, to operate as herein described.

In testimony whereof I have signed my name to this specification in the presence of two subscribing witnesses.

SYLVESTER HURD.

Witnesses:
G. W. GREGORY,
N. E. WHITNEY.